April 8, 1941.  A. A. McCORMACK  2,237,494
SEAL FOR REFRIGERATING APPARATUS
Filed Aug. 31, 1938   6 Sheets-Sheet 1

Fig. 1

INVENTOR.
ALEX A. McCORMACK
ATTORNEYS

April 8, 1941.　　　A. A. McCORMACK　　　2,237,494
SEAL FOR REFRIGERATING APPARATUS
Filed Aug. 31, 1938　　　6 Sheets-Sheet 3

INVENTOR.
ALEX A. McCORMACK
ATTORNEYS

April 8, 1941.  A. A. McCORMACK  2,237,494
SEAL FOR REFRIGERATING APPARATUS
Filed Aug. 31, 1938   6 Sheets-Sheet 4

INVENTOR.
ALEX A. McCORMACK
ATTORNEYS

INVENTOR.
ALEX A. McCORMACK
ATTORNEYS

April 8, 1941.　　　A. A. McCORMACK　　　2,237,494
SEAL FOR REFRIGERATING APPARATUS
Filed Aug. 31, 1938　　　6 Sheets-Sheet 6

INVENTOR.
ALEX A. McCORMACK
ATTORNEYS

Patented Apr. 8, 1941

2,237,494

UNITED STATES PATENT OFFICE 2,237,494

SEAL FOR REFRIGERATING APPARATUS

Alex A. McCormack, Dayton, Ohio, assignor to General Motors Corporation, Dayton, Ohio, a corporation of Delaware Application August 31, 1938, Serial No. 227,758

21 Claims. (Cl. 286—7)

This application is, in part, a continuation of my copending applications Serial No. 733,279, filed June 30, 1934, and Serial No. 745,957 filed September 28, 1934, and, in part a continuation of copending application Serial No. 29,128, filed June 29, 1935.

This invention relates to refrigerating apparatus and more particularly to compressors for use in refrigerating machines. The present invention aims to provide a seal which is of a relatively permanent character; but, if the same should wear out, the same can be replaced with a relatively small amount of labor.

Another object of the invention is to provide a seal of a character such that the casing portion of the seal automatically adjusts itself to the running portion of the seal.

Further objects and advantages of the present invention will be apparent from the following description, reference being had to the accompanying drawings, wherein a preferred form of the present invention is clearly shown.

Figure 1:
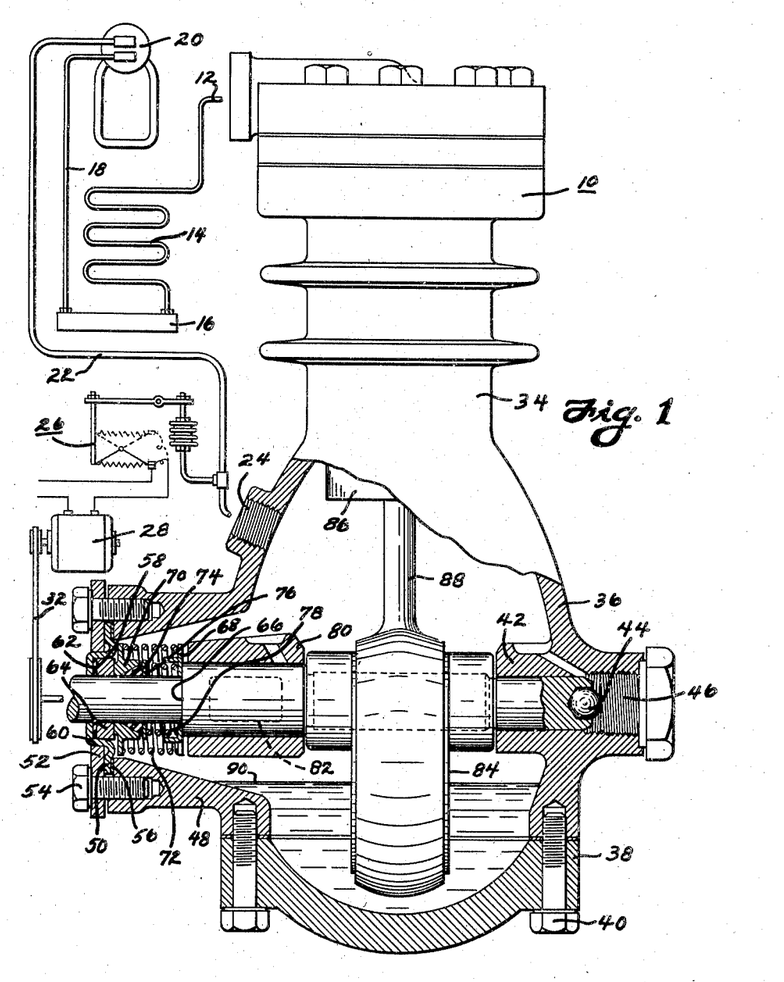
Fig. 1 is a view partly in cross-section of a compressor embodying the present invention, the essential elements of the refrigerating system being shown diagrammatically.

Referring now to Fig. 1, there is shown a refrigerating system comprising a compressor 10 having a discharge conduit 12 leading to a condenser 14, which is in turn connected to a liquid refrigerant receiver 16 communicating by conduit 18 with an evaporator 20 which may contain the usual float valve for controlling the expansion of liquid refrigerant into the evaporator 20 and connected by conduit 22 to the intake 24 of the compressor 10. A low pressure control switch 26 is adapted to intermittently operate the motor 28 which drives the compressor shaft 30 by means of a belt drive 32.

Figure 4:
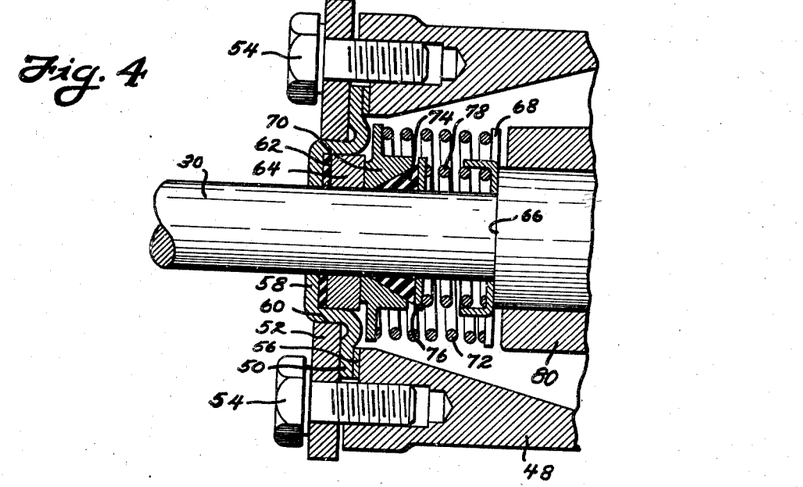
Fig. 4 is an enlarged view of a portion of Fig 1.

The compressor comprises the usual cylinder 34 which may be formed integrally with a crankcase 36. A cover plate 38 is secured to the crankcase 36 by bolts 40 for providing access to the interior of the crankcase. At one side of the crankcase 36, there is provided a bearing 42 for receiving one end of the shaft 30, a ball 44 being provided to take end thrusts against a screw 46 which closes the end of the bearing. The opposite side of the crankcase is formed with a tubular extension 48 which is hollow and forms an extension of the interior chamber of the crankcase. The extension 48 is adapted to be closed by a cover plate 50 which is clamped to the extension 48 by means of a clamping plate 52, bolts 54 and a gasket 56. The cover plate 50 has a central outwardly extending inwardly projecting recess 58 which projects through a central opening 60 in the clamping plate 52. Recess 58 is adapted to receive a packing washer 62 which may be formed of a polymer of chloro-2-butadiene-1,3, known in the trade as "Duprene" and a hardened metallic sealing ring 64.

Shaft 30 is formed with a shoulder 66 against which is placed a spring backing plate 68. A rotary sealing ring 70 located on the shaft adjacent the sealing ring 64 is maintained in engagement with the sealing ring 64 by a spring 72 interposed between the ring 70 and the spring plate 68. A resilient packing member 74 is located within a conical recess in the back face of the ring 70 and is forced into snug packing engagement between the ring 70 and the shaft 30 by means of a washer 76 and a spring 78. Inwardly of the shoulder 66, there is provided a second bearing 80 for the shaft 30 which is located entirely within the crankcase and which may be supported by a transverse strut 82 preferably formed integrally with the crankcase 36 and the bearing 80. The shaft 30 carries the usual eccentric 84 for reciprocating the piston 86 through the medium of the connecting rod 88 in the manner well known in the art.

In operation, shaft 30 is rotated by the motor 28 through the belt drive 32 which causes reciprocation of the piston 86 to compress gaseous refrigerant and circulate it through the refrigerating system in the well known manner. The sealing ring 70 is maintained in snug running engagement with the sealing ring 64 by means of the spring 72. The ring 64 is stationary and fixed to the cover plate 50, as well as sealed thereto by means of the packing member 62, while the sealing ring 70 rotates with the shaft to which it is maintained in a fixed and gastight relation by means of the spring 78 compressing through the washer 76 on the packing 74. A body of lubricant is maintained in the bottom of the crankcase to a level such as that indicated by the line 90 and the repeated dipping of the eccentric 84 into the body of lubricant causes the same to be constantly splashed throughout the crankcase chamber. This provides lubrication for the moving parts of the compressor as is well known in the art and, in addition, due to the fact that the rotary shaft seal mechanism is located in the same chamber with the main body of lubricant, provides a constant bath of lubricant for all parts of the shaft seal. Inasmuch as the shaft seal is exposed directly to the intense splashing action of the eccentric in the lubricant, a far better lubrication is maintained on the seal than can be provided by other constructions wherein the seal is located in a separate chamber to which lubricant is fed by gravity or other means.

Figures 2, 3:
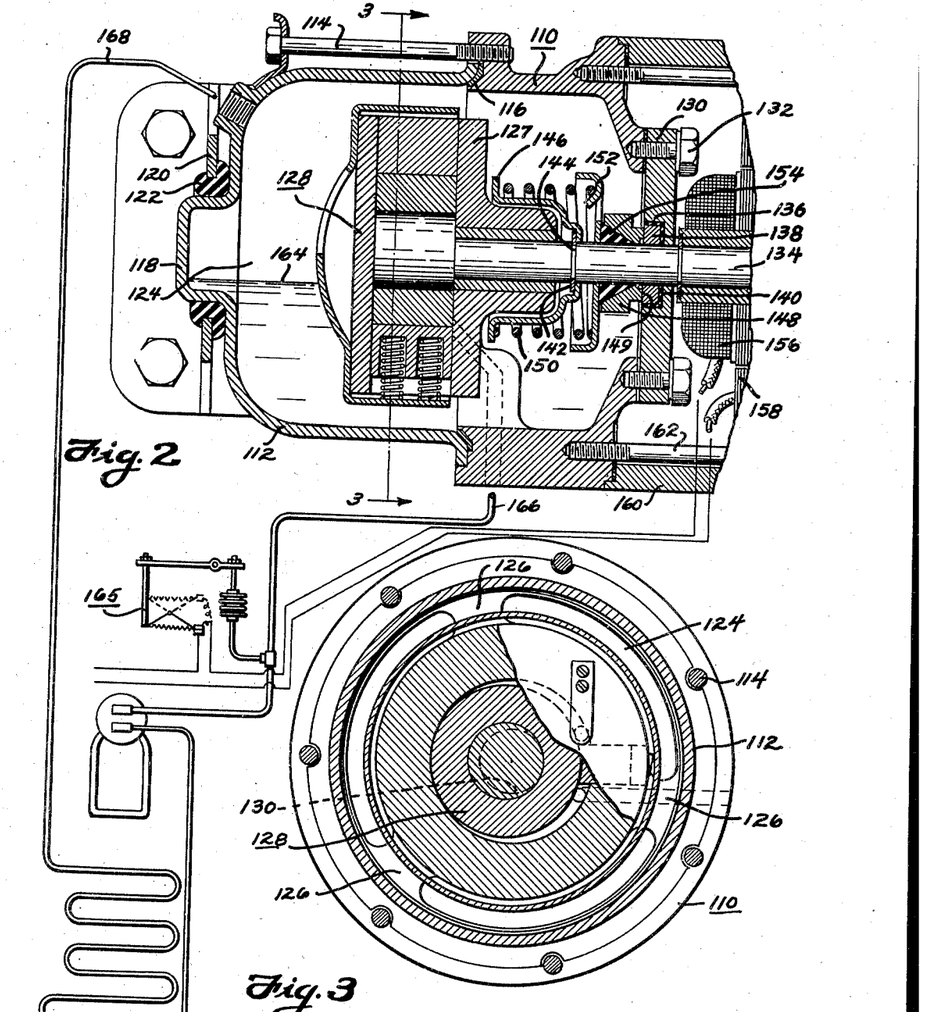
Fig. 2 is a longitudinal cross-section of a modified form of the present invention showing parts of a refrigerating system diagrammatically.
Fig. 3 is a transverse cross-section on line 3—3 of Fig. 2.

In Fig. 2, there is shown an embodiment of the invention applied to a rotary type of compressor which is enclosed in a sealed casing having a compressor shaft extending through the casing to a motor located outside thereof. The casing may comprise a main frame or housing member 110 of annular shape having a cup-shaped end cover 112 secured thereto by bolts 114 and a gasket 116. The cover 112 is provided with an outwardly extending boss 118 adapted to form a supporting lug for the device which may be insulated from the fixed support 120 by the resilient ring 122 formed of rubber or equivalent material.

The main frame 110 and the cover plate 112 together form a chamber 124 within which is supported by means of arms 126 (Fig. 2), a bearing plate 127 for rotary compressor 128, which may be of any well known type, and which forms no part of the present invention. The open end of the frame 110 opposite the cover 112 is closed by a removable cover plate 130 secured to the frame 110 by bolts 132 and having an aperture for receiving the compressor shaft 134. A recess 136 is formed in the inner face of the plate 130 for the reception of a hardened metal stationary sealing ring 138 and a cup-shaped sealing gasket 140 which is preferably formed of a polymer of chloro-2-butadiene-1,3, which may be referred to, in the trade, as a synthetic rubber under the name of "Duprene."

Figure 5:
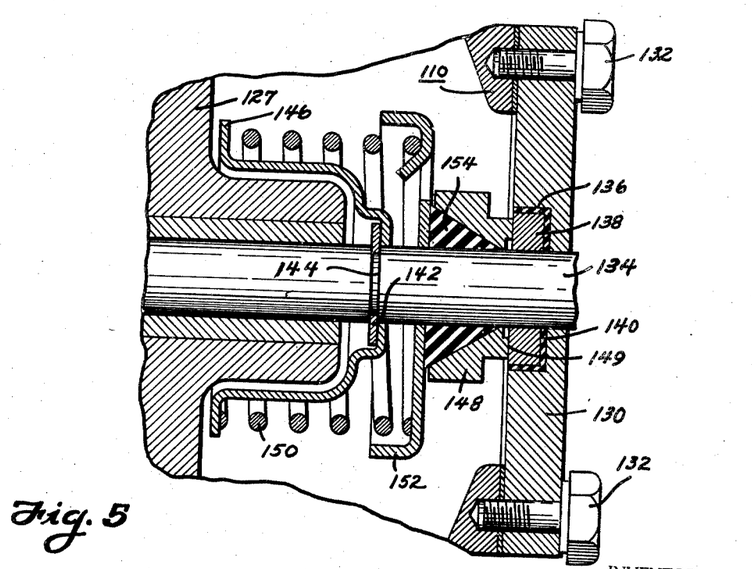
Fig. 5 is an enlarged view of a portion of Fig. 2.

The rotary portions of the shaft seal comprise a two part slit washer 142 adapted to be retained in a groove 144 in shaft 134 by means of a cup-shaped spring backing plate 146. A rotary packing ring or sleeve 148 is maintained in snug running engagement with the stationary packing ring 138 by means of a spring 150 which acts on the ring 148 through the medium of a spring plate 152 and a resilient packing member 154 adapted to seal and frictionally engage the ring 148 to the shaft. The sleeve 148, as indicated by the cross-section in the drawings, is of metal and is provided with a rotative seal member 149 having a flat sealing face to provide a seal or ground fit between the relatively rotative seal members. The compressor shaft 134 carries outside the chamber 124 the rotor 156 of an electric motor which also includes the stator 158 and the frame ring 160 secured to the main frame 110 by bolts 162. A combination lubricating and sealing fluid is maintained in the chamber 124 up to about a level indicated by the line 164.

In operation, the electric motor under the control of the switch 165 rotates the compressor shaft 134 which in turn causes gaseous refrigerant to be withdrawn from the low side conduit 166 and compressor into the chamber 124 from whence it is circulated to the refrigerating system through the high side conduit 168 in a well known manner. The plates 146 and 152, as well as the spring 150 and sealing ring 148 having their lower portions dipping into the body of lubricant cause a violent churning action thereof, which in turn distributes lubricant in the form of a constant spray throughout particularly the right hand end of the chamber 124. This action causes the seal to be constantly lubricated in a running shower of lubricant and contributes materially to the long life of the seal without leakage.

Figure 6:
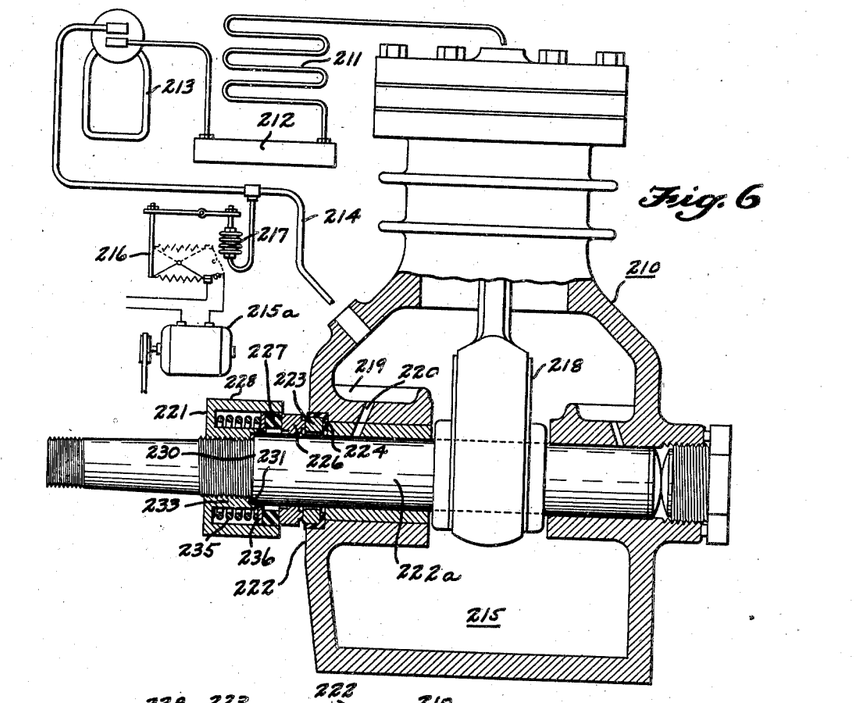
Fig. 6 is a diagrammatic view, partly in cross-section, of a modification.

In Fig. 6 the compressor 210 discharges into the condenser 211 having a liquid receiver 212 and from whence refrigerant is delivered to an evaporator 213 where the refrigerant is evaporated and returns through the pipe 214 to the crankcase 215 of the compressor. A motor 215a drives the compressor, starting and stopping in accordance with refrigeration conditions, such as under the control of a snap switch 216 actuated by a bellows 217 in response to the back pressure of the refrigerating system.

The crankcase 215 contains lubricant which is splashed by the eccentric 218 to the various bearings. Thus it is splashed into the cup 219 having a passageway 220 to the bearing near the seal 221. Oil or other lubricant finds its way along the shaft to the running surface of the seal.

Figure 7:
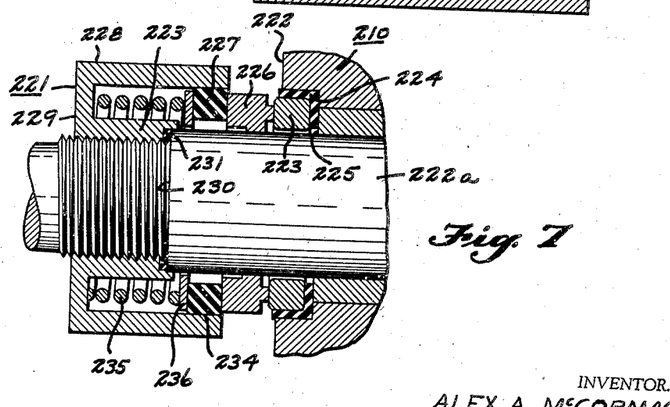
Fig. 7 is an enlarged view of a portion of Fig. 6.

The seal is made at the wall 222 through which the shaft 222a passes. A sealing running surface is provided on this wall, preferably by inserting a metal ring 223, made of nitro-alloy or the like, along with a resilient rubber-like washer 224 into the recess 225 of the wall 222. A second metal ring 226 of leaded bronze alloy or the like is loosely placed on the shaft. A resilient rubber-like washer 227 is placed with one of its faces against the ring 226 and another face against the rim 234 of the cup-like member 228 which is sealed to the shaft outside of the wall 222. The cup-like member 228 has its bottom portion 229 sealed to the shaft, for example, by providing a shoulder 230 on the shaft against which a rubber-like washer 231 is sealed by the threaded extension 233 of the cup-like member 228. The cup-like member 228 is screwed onto the shaft so that the extension 233 of bottom portion 229 is sealed to the shaft.

Means are provided for resiliently urging the washer 227 against the ring 226 and against the rim 234 of the cup. The rim 234 is directed towards the wall 222 and a coiled spring 235 is placed within the cup so that one end is pressed against the bottom 229 and the other end is pressed against the metal washer 236 which in turn presses against the resilient washer 227.

This causes the washer 227 to expand outwardly and seal against the rim 234 and also against the ring 226. The ring 226 rotates with the shaft because of the frictional driving power of washer 227. The sealing running surfaces upon the contacting faces of the rings 223 and 226 are suitably ground or lapped so that fluid does not escape therethrough.

The seal thus constructed prevents gases or lubricant from passing around the outside of the ring 223 by virtue of the rubber-like washer 225. The running surfaces 237 are fluid-tight, and the washers 227 and 231 prevent the passage of fluids past the faces against which they bear. This seal can be readily applied and removed from the mechanism since it is only necessary to screw or unscrew the cup 228 from the shaft and the other parts are readily applied or removed longitudinally of the shaft in a manner which is obvious from the disclosure.

Figure 8:
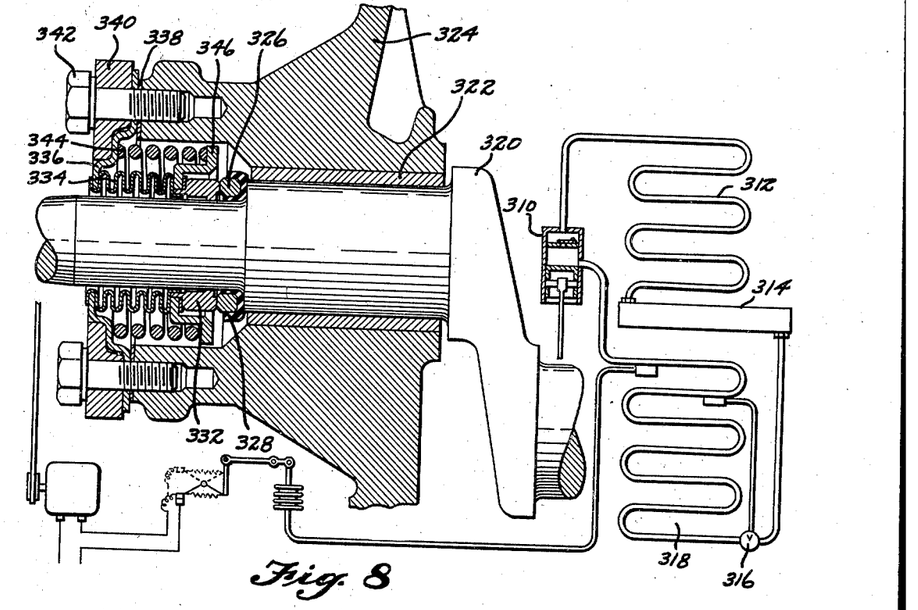
Fig. 8 is a sectional view of a portion of a compressor embodying one form of the present invention and showing diagrammatically the essential elements of a refrigerating apparatus.

Referring now to Fig. 8, there is illustrated diagrammatically the essential elements of a refrigerating apparatus which include a compressor 310, a condenser 312, receiver 314, expansion valve 316 and an expansion coil 318 connected in series in the order named which operate to withdraw heat from an object to be cooled into the evaporator 318 and to dissipate the heat from the condenser 312 to the surrounding air or other cooling medium. The compressor has a crank shaft 320 extending through a bearing 322 which forms an aperture in the wall 324 in the crankcase of the compressor. Suitable driving means for the compressor (not shown) coact with the outwardly extending end of the crank shaft 320 to cause rotation of the same.

Figures 9, 10:
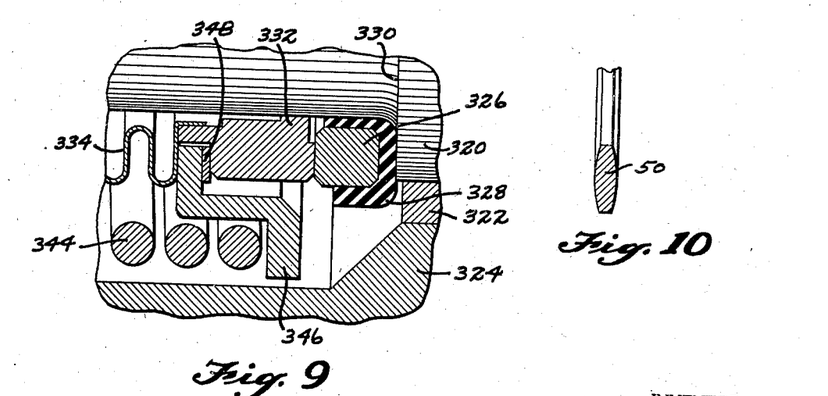
Fig. 9 is a fragmentary section corresponding to Fig. 8 on a larger scale.
Fig. 10 is a fragmentary view of a modified form of pressure ring suitable for use in the structure of Fig. 8.

In order to effectively seal the joint between the shaft 320 and the wall aperture 322, a shaft seal is provided which comprises a stationary sealing ring 326 formed of extremely hard metal having a generally rectangular cross-section with the corners somewhat rounded or relieved. The ring 326 is supported in a gasket 328 which is formed to surround three sides of the ring 326, or in other words, comprises a flat annular portion having inner and outer cylindrical portions integrally attached thereto. The ring 326 and gasket 328 are pressed snugly against a shoulder 330 formed on the shaft 320. Due to the particular form of the gasket 328, the ring 326 when pressed toward the shoulder 330 causes a snug and fluid-tight frictional sealing and driving fit between the ring 326 and the shaft 320. The gasket 328 is preferably formed of a resilient rubber or rubber-like material capable of withstanding the deteriorating effects of common refrigerants and lubricants and may comprise for example a polymer of chloro-2-butadiene-1,3, known in the trade as "Chloroprene" or "Duprene." Coacting with the hard sealing ring 326 is an axially movable sealing ring 332 formed of a softer metal, for example, bronze. The sealing ring 332 is hermetically sealed to the wall 324 by means of a bellows 334, a bellows plate 336 and a gasket 338. A clamping plate 340 removably secures the bellows plate 336 to the wall 324 by means of the bolts 342. In order to maintain the ring 332 in close running engagement with the ring 326, a spring 344 is provided having one end abutting against the bellows plate 336 and the other end abutting against the spring plate 346. The spring plate 346 in turn transmits the force of the spring to the ring 332 through a bearing ring 348. The ring 348 is preferably made of a material softer than either the spring plate 346 or the ring 332 and which has the characteristic of not adhering to the solder used to seal the bellows to the ring 332. For example, the bearing ring 348 may be formed of aluminum. The bellows 334 is soldered at its outer end to the bellows plate 336 and at its inner end to the ring 332. In addition, if desired, the bellows may be soldered to the spring plate 346, although this is not essential to the maintenance of a fluid-tight seal.

In operation, as the shaft 320 rotates, the ring 326 and gasket 328 rotate therewith, due to the snug engagement therebetween provided by the gasket 328. The sealing ring 332 is stationary except for the slight axial movement necessary to take up wear and provides a running seal between the abutting faces of the rings 326 and 332. The spring 344 maintains the ring 332 in engagement with the ring 326 and it will be noted that due to the inter-position of the bearing ring 348 of comparatively soft material that any warpage which may occur in the spring plate 346 is not transmitted to the sealing ring 332. By this construction, the running face of the ring 332 is always maintained perfectly flat, thus contributing materially to the maintenance of a fluid-tight seal throughout a long period of useful life.

In Fig. 10, there is disclosed a modified form of bearing ring 350 which may be used in place of the bearing ring 348. The ring 350 has such a cross-sectional shape that it contacts with the spring plate 346 and with the sealing ring 332 in a line contact. By this construction, the ring 350 need not be of softer material than the ring 332 and the spring plate 346, although it is preferable to have it so and in addition, a somewhat greater latitude of warpage in the spring plate 346 is permissible without affecting the ring 332.

Figure 11:
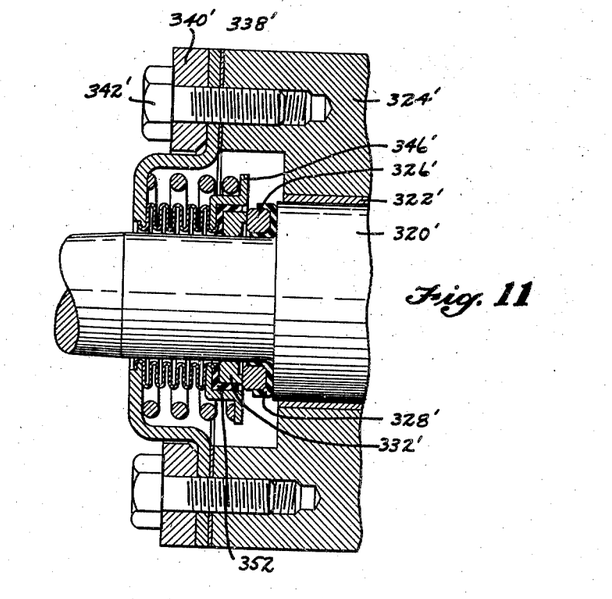
Fig. 11 is a sectional view of a portion of a compressor embodying the modified form of the invention.
Figure 12:
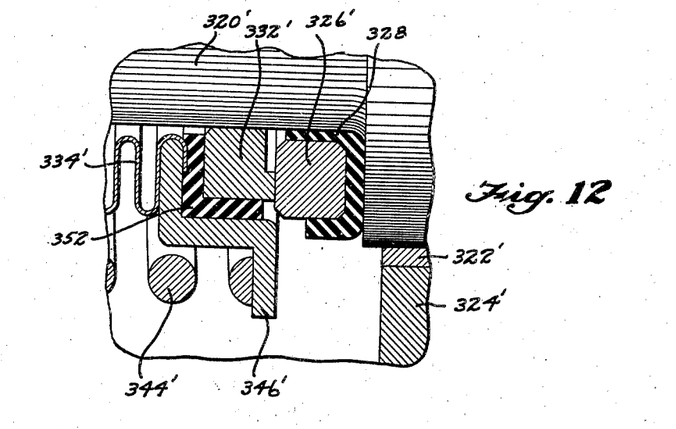
Fig. 12 is a fragmentary section corresponding to Fig. 11 on a larger scale.

Referring now to Figs. 11 and 12, there is disclosed a similar shaft seal in which the corresponding primed reference numerals refer to parts equivalent to those shown in Figs. 8 and 9. The elements of this seal are substantially the same as those in Fig. 8 with the exception of the bearing ring between the spring plate 346' and the sealing ring 332'. In the present embodiment, this ring takes the form of an angularly shaped ring or gasket 352 preferably formed of the same material as the gasket 328. Also in this form of the invention, the bellows 334' is soldered to the spring plate 346' but not to the sealing ring 332'. The rubber-like characteristics of the bearing ring or gasket 352 provide a hermetic seal as well as a tight frictional fit between the spring plate 346' and the ring plate 332'. It will be seen that the resilience of the gasket 352 also permits a considerable degree of warpage to take place in the spring plate 346' without causing any warpage in the sealing ring 332'.

This application is a continuation-in-part of applications S. N. 733,279, S. N. 29,128 and S. N. 745,957.

In all of the modifications, where the cross-hatching indicates a rubber-like construction, either rubber or other resilient material may be used. A compound the base of which is made from the polymers of chloro-2-butadiene-1,3 may also be used. This seal is useful in retaining the ordinary lubricants and refrigerants used in domestic refrigerating systems. Ordinary mineral oils and usual refrigerants such as sulphur dioxide, any volatile hydrocarbon compounds or their derivatives may be retained. Where the polymer composition above referred to is used, it is particularly useful in retaining the halofluoro derivatives of the aliphatic hydrocarbons such as $CCl_2F_2$ or $C_2Cl_2F_4$ when used with mineral oil lubricants.

While the form of embodiment of the invention as herein disclosed, constitutes a preferred form, it is to be understood that other forms might be adopted, all coming within the scope of the claims which follow.

What is claimed is as follows:

1. The combination of a housing member, a shaft extending through the housing member and rotatable with respect thereto, and a seal between the shaft and the housing member including a sleeve rotatably mounted with and sealed at one end to the shaft, and rotative seal members, one of which is carried by said sleeve and the other of which is carried by said housing member; said seal members being of metal and forming a running seal, and the one carried by said housing member being a removable insert therein and being secured thereto and sealed therein by a cup-shaped rubber washer which permits said insert to adjust itself to the other seal member.

2. The combination of a housing, a shaft extending through said housing and rotatably journaled therein, a cover for said housing surrounding said shaft, and a seal between said shaft and said cover including a resilient sleeve rotatably mounted with and sealed at its inner end to said shaft, and rotative seal members, one of which is carried by said sleeve and the other of which is carried by said cover; said seal members being of metal and forming a running seal, and the one carried by said cover being a removable insert therein and being secured thereto and sealed therein by a cup-shaped rubber washer which permits said insert to adjust itself to the other seal member.

3. The combination of a housing, a shaft extending therethrough and rotatably journaled therein, a cover secured to said housing and surrounding said shaft, and a seal between said shaft and said cover including a rubber washer having a radial portion bearing against a shoulder on said shaft and having a sleeve portion extending along said shaft, a sealing unit bearing against both portions of said rubber and sealed by it to said shaft and rotated by it with the shaft, and a companion seal member carried by said cover and having a gas-tight rotative fit with said seal unit.

4. In a compressor including a housing containing compressor apparatus and gas to be compressed, a shaft extending through said housing and rotatably journaled therein for driving said apparatus, and a seal between said shaft and said housing including a pair of seal members having a rotatably sliding fit, one of said members being secured to said housing and the other of said members being supported on said shaft and sealed thereto and rotated therewith by a resilient washer having a sleeve portion pinched between said shaft and said last named member and except for said washer being free to turn with respect to said shaft.

5. The combination of a housing member, a shaft extending therethrough and rotatable with respect thereto and having an annular shoulder facing the housing member, and a seal between the shaft and the housing member including a rubber washer having a radial portion bearing against the shoulder on the shaft and having a sleeve portion extending along the shaft, a sleeve unit having one end bearing against both portions of the rubber washer and pinching the sleeve portion thereof against the shaft and having a running seal surface at its other end, and a ring having a companion running seal surface and carried by the housing member and engaging the first named running seal surface to effectuate a seal therewith while permitting its rotation.

6. The combination of a housing member, a shaft extending therethrough and rotatable with respect thereto and having an annular shoulder facing the housing member, and a seal between the shaft and the housing member including a rubber washer having a radial portion bearing against the shoulder on the shaft and having a sleeve portion extending along the shaft, a sleeve unit having one end bearing against both portions of the rubber washer and pinching the sleeve portion thereof against the shaft and having a running seal surface at its other end, and a ring having a companion running seal surface and carried by the housing member and engaging the first named running seal surface to effectuate a seal therewith while permitting its rotation, said ring being secured in the housing member by a cup-shaped washer which permits the ring to adjust itself to the first running seal surface.

7. The combination of a housing member, a shaft extending therethrough and rotatable with respect thereto and having an annular enlargement facing generally toward the housing member, and a seal between the shaft and the housing member including a rubber washer bearing against said enlargement, a sleeve unit having one end bearing against the rubber washer in both axial and radial directions and squeezing it against the shaft in both axial and radial directions, and having a running seal surface at the other end, a ring having a companion running seal surface and carried by the housing member and engaging the first named running seal surface to effectuate a seal therewith while permitting its rotation, and means for exerting a thrust between the sleeve member and the shaft and between the running seal surfaces.

8. The combination of a housing member, a shaft extending therethrough and rotatable with respect thereto and having an annular enlargement facing generally toward the housing member, and a seal between the shaft and the housing member including a rubber washer bearing against said enlargement, a sleeve unit having one end bearing against the rubber washer in both axial and radial directions and squeezing it against the shaft in both axial and radial directions, and having a running seal surface at the other end, a ring having a companion running seal surface and carried by the housing member and engaging the first named running seal surface to effectuate a seal therewith while permitting its rotation, and means for exerting a thrust between the sleeve member and the shaft and between the running seal surfaces; the end of the sleeve carrying a running seal surface having a clearance with the shaft to permit play with respect thereto.

9. The combination of a housing, a housing member removably sealed to the housing, a shaft extending from the housing and journaled therein and having an annular enlargement facing generally toward the housing member, and a seal between the shaft and the housing member including a resilient washer bearing against said enlargement, a sleeve unit having one end bearing against the resilient washer and squeezing it against the shaft in both axial and radial directions, and having a running seal surface at the other end, a ring having a companion running seal surface carried by the housing member and engaging the first named running seal surface to effectuate a seal therewith while permitting its rotation, and means for exerting a thrust between the sleeve member and the shaft and between the running seal surfaces, said washer being positioned radially between the sleeve unit and the shaft and wedged therebetween whereby the accurate positioning of the sleeve unit with respect to the shaft and a high sealing pressure are obtained and slippage between the sleeve unit and the shaft is prevented.

10. The combination of a housing member, a shaft extending through the housing member and rotatable with respect thereto, and a seal between the shaft and the housing member including a sleeve rotatably mounted with and sealed at one end to the shaft, and rotative seal members, one of which is carried by said sleeve and the other of which is carried by said housing member; said seal members being of metal and forming a running seal, and the one carried by said housing member being a removable insert in an oversize recess therein and being sealed therein and restrained from turning by a rubber washer which is positioned in part between the bottom of the recess and the seal member therein extending into the annular space between the sides of the seal member and the recess and which permits said insert to adjust itself to the other seal member.

11. A shaft seal comprising a shaft, a casing wall surrounding an enclosure, said casing wall having an aperture through which the shaft extends, said aperture being provided with a counterbore, a flexible stationary washer resting within said counterbore against an outwardly directed face of said wall, said flexible stationary washer being substantially L-shaped in cross section, a metal ring received within the periphery of said stationary washer and resting against said washer and having an outwardly directed sealing running surface away from said wall, a second metal ring having a sealing running surface in contact with the sealing running surface of said first metal ring, a second flexible washer in contact with sa'd second metal ring, a metal member contacting said flexible washer and said shaft, a third flexible washer for sealing said member to said shaft, said metal member being provided with threaded fastening means for holding said third flexible washer in tight sealing engagement with the shaft.

12. A shaft seal comprising a shaft, a casing wall surrounding an enclosure, said casing wall having an aperture through which the shaft extends, a recess surrounding said aperture, a flexible stationary washer resting within said recess against an outwardly directed face of said wall, said washer having an annular recess, a metal ring resting within said recess of said washer and having an outwardly directed sealing running surface away from said wall, a second metal ring having a sealing running surface in contact with the sealing running surface of said first metal ring, a second flexible washer in contact with said second metal ring, a metal ring member threaded directly on to the shaft in contact with said second flexible washer.

13. A shaft seal comprising a shaft, a casing wall surrounding an enclosure, said casing wall having an aperture through which the shaft extends, a recess surrounding said aperture, a flexible stationary washer resting within said recess against an outwardly directed face of said wall, said washer having an annular recess, a metal ring resting within said recess of said washer and having an outwardly directed sealing running surface away from said wall, a second metal ring having a sealing running surface in contact with the sealing running surface of said first metal ring, a second flexible washer in contact with said second metal ring, a metal ring member threaded directly on to the shaft in contact with said second flexible washer, all parts of the wall structure of said casing wall lying on the opposite side of the plane of the sealing running surface from the threaded member.

14. In a compressor shaft seal, the combination of a wall member having an aperture, a shaft member passing through said aperture, an axially stationary sealing ring associated with one of said members, an axially movable sealing ring associated with the other member, means forming a shouldered seat for one of said rings, and a gasket of resilient material between said ring and said seat, said gasket being formed of a flat annular portion having integral inner and outer cylindrical portions, said outer cylindrical portion being around said ring, and said ring being around said inner cylindrical portion.

15. In a compressor shaft seal, the combination of a wall member having an aperture, a shaft member passing through said aperture, an axially stationary sealing ring associated with one of said members, an axially movable sealing ring associated with the other member, means forming a shouldered seat for one of said rings, and a gasket of resilient material between said ring and said seat, said gasket being formed of a flat annular portion having an integral cylindrical portion at the outer edge of the annular portion around said ring.

16. In a compressor shaft seal, the combination of a wall member having an aperture, a shaft member passing through said aperture, an axially stationary sealing ring associated with one of said members, an axially movable sealing ring associated with the other member, bellows means for sealing said second ring to said other member in all positions of axial adjustment, a spring for urging said second ring into engagement with the first, and a spring plate for transmitting the force of the spring to the second ring, said bellows means being soldered to said spring plate and said sealing ring and means including an annular member of a material to which the solder does not adhere interposed between the second ring and the spring plate to provide a floating engagement therebetween by a portion of said bellows means.

17. In a compressor shaft seal, the combination of a wall member having an aperture, a shaft member passing through said aperture, an axially stationary sealing ring associated with one of said members, an axially movable sealing ring associated with the other member, means forming a shouldered seat for one of said rings, and a gasket of resilient material between said ring and said seat, said gasket being formed of a flat annular portion having an integral inner cylindrical portion, said ring being around said inner cylindrical portion, said two portions together forming an annular member L-shaped in cross section.

18. In a compressor shaft seal, the combination of a wall member having an aperture, a shaft member passing through said aperture and having a shouldered seat, an axially stationary sealing ring associated with said shaft member, an axially movable sealing ring associated with said wall member, and a gasket of resilient material between said ring and seat, said gasket being formed of a flat annular portion having integral inner and outer cylindrical portions, said outer cylindrical portion being around said ring and said ring being around said inner cylindrical portion, said flat portion together with the inner and outer cylindrical portions forming an annular member substantially U-shaped in cross section.

19. In a compressor shaft seal, the combination of a wall member having an aperture, a shaft member passing through said aperture and having a shouldered seat, an axially stationary sealing ring associated with said shaft member, an axially movable sealing ring associated with said wall member, and a gasket of resilient material between said ring and seat, said gasket being formed of a flat annular portion having an integral cylindrical portion at the outer edge of the annular portion around said ring, said two portions together forming an annular member having an L-shaped cross section.

20. In a compressor shaft seal, the combination of a wall member having an aperture, a shaft member passing through said aperture and having a shouldered seat, an axially stationary sealing ring associated with said shaft member, an axially movable sealing ring associated with said wall member, and a gasket of resilient material between said ring and seat, said gasket being formed of a radially extending flat annular portion having an integral inner cylindrical portion, said ring being around said inner cylindrical portion, said two portions together forming an annular member having an L-shaped cross section.

21. The combination of a housing, a shaft extending through said housing and rotatably journaled therein, closure means carried by said housing surrounding said shaft, and a seal between said shaft and said closure means including a resilient sleeve rotatably mounted with and sealed at its inner end to said shaft, and rotative seal members, one of which is carried by said sleeve and the other of which is carried by said closure means; said seal members being of metal and forming a running seal, and the one carried by said closure means being an insert therein and being secured thereto and sealed therein by a substantially cup-shaped rubberlike washer which permits said insert to adjust itself to the other seal member.

ALEX A. McCORMACK.